US006434183B1

(12) United States Patent
Kockmann et al.

(10) Patent No.: US 6,434,183 B1
(45) Date of Patent: Aug. 13, 2002

(54) METHOD AND DEVICE FOR RADIO TRANSMISSION OF DATA BY MEANS OF FREQUENCY HOPS

(75) Inventors: Juergen Kockmann; Uwe Sydon, both of Düsseldorf; Peter Schliwa, Hamminkeln; Andreas Mueller, Rees, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,572

(22) PCT Filed: Aug. 14, 1997

(86) PCT No.: PCT/DE97/01733

§ 371 (c)(1),
(2), (4) Date: May 9, 2000

(87) PCT Pub. No.: WO99/09678

PCT Pub. Date: Feb. 25, 1999

(51) Int. Cl.[7] .......................... H04B 1/703; A61F 2/06; H04L 27/30
(52) U.S. Cl. ...................... 375/132; 370/337; 370/347; 370/458
(58) Field of Search ................................ 375/130, 131, 375/132, 133, 138; 370/294, 337, 347, 442, 280, 458

(56) References Cited

U.S. PATENT DOCUMENTS

| | | | | |
|---|---|---|---|---|
| 5,787,076 A | * | 7/1998 | Anderson et al. | 370/294 |
| 5,884,148 A | * | 3/1999 | Bilgic et al. | 455/404 |
| 6,005,856 A | * | 12/1999 | Jensen et al. | 370/280 |
| 6,041,046 A | * | 3/2000 | Scott et al. | 370/319 |

FOREIGN PATENT DOCUMENTS

| | | |
|---|---|---|
| EP | 0 662 775 A1 | 7/1995 |
| EP | 0 767 551 A2 | 4/1997 |
| GB | 2 293 525 A | 3/1996 |

OTHER PUBLICATIONS

Rasky, Phillip D. et al., "Slow Frequency—Hop TDMA/CDMA for Macrocellular Personal Communications", IEEE Personal Communications (1994) $2^{nd}$ Quarter, No. 2, pp. 26–35.

* cited by examiner

*Primary Examiner*—Stephen Chin
*Assistant Examiner*—Lenny Jiang
(74) *Attorney, Agent, or Firm*—Bell, Boyd & Lloyd LLC

(57) ABSTRACT

According to the invention, a method and an arrangement is provided for digital radio transmission of data between a fixed station (1) and at least one mobile station (2, 3) at one of a plurality of carrier frequencies ($f_1$, $f_2$, etc.) the data being transmitted in time slots (Z1, Z2 etc.) using time-division multiplex method (TDMA) and, in particular if so-called slow hopping RF modules are used, the change from one carrier frequency to another carrier frequency requiring at least a time period corresponding to one time slot. According to the invention, the data are transmitted in two successive active time slots (Z1, Z2) which are followed by an inactive time slot, in which no data are transmitted. The transmission in two successive time slots (Z1, Z2) takes place at the same carrier frequency. If the method or the arrangement according to the invention are used for the purpose of matching the DECT standard to the US-American ISM band, six time slots for transmitting from the fixed station to at least one mobile station can be followed by six time slots for transmitting from the at least one mobile station (2, 3) to the fixed station (1).

9 Claims, 2 Drawing Sheets

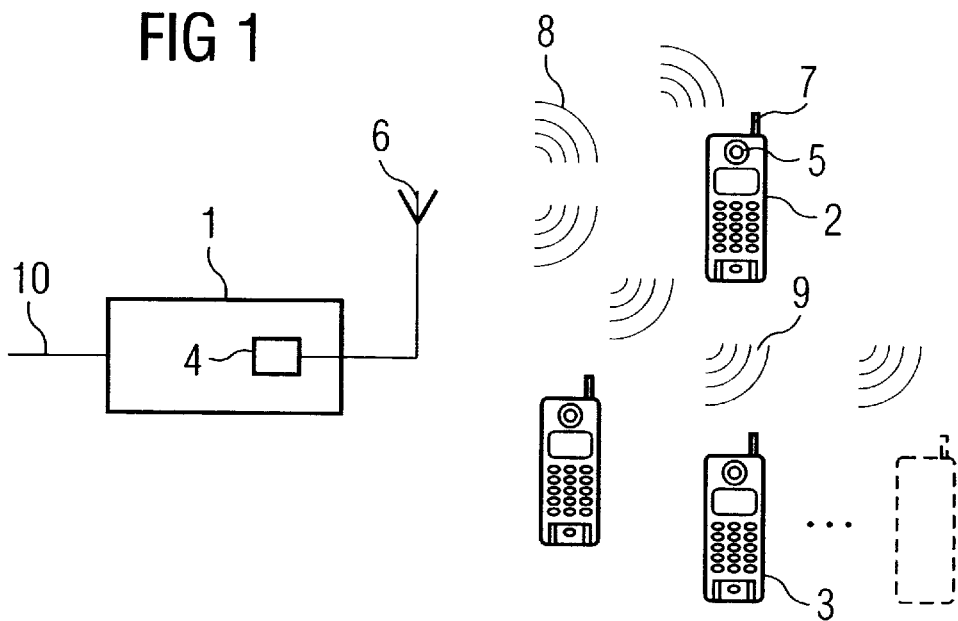
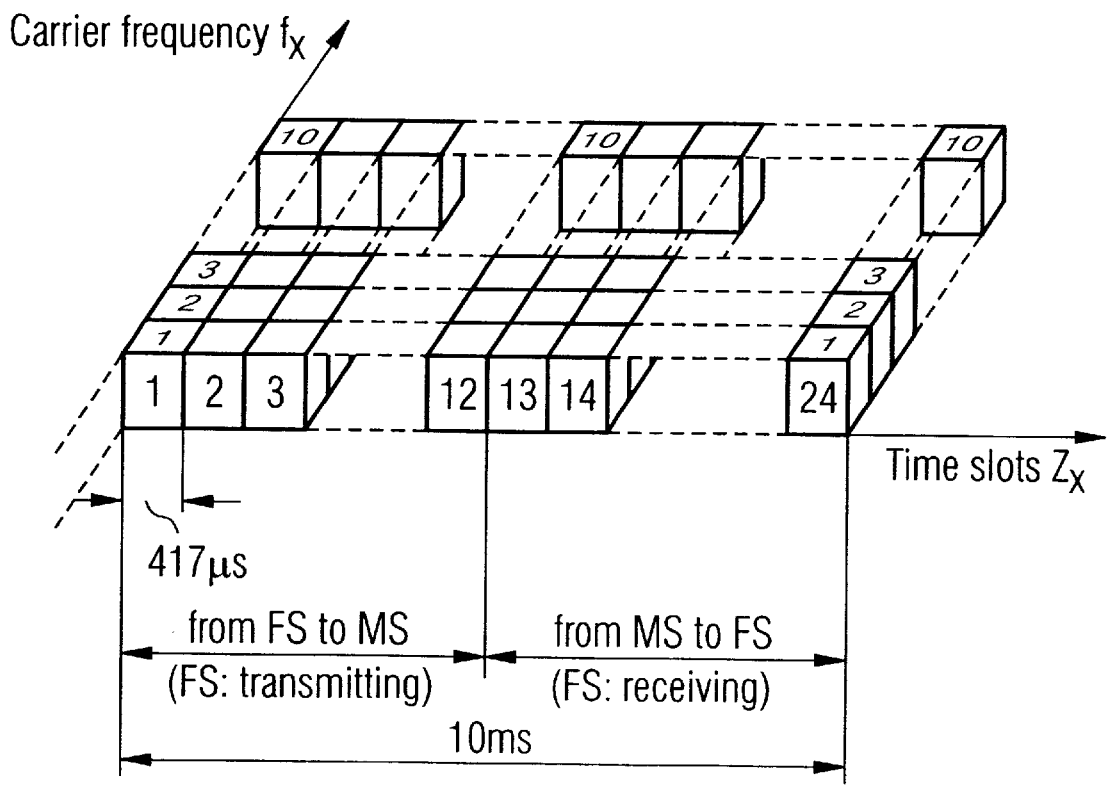

METHOD AND DEVICE FOR RADIO TRANSMISSION OF DATA BY MEANS OF FREQUENCY HOPS

BACKGROUND OF THE INVENTION

1. Field of the Invention

The present invention relates to a method for radio transmission of data between a fixed station and at least one mobile station at one of a plurality of carrier frequencies in time slots using a time division multiplex method and time division duplex method where the change from one carrier frequency to another for a subsequent time slot requires a predetermined time period in the order of magnitude of one time slot, and the data is transmitted in two successive active time slots followed by an inactive time slot in which no data are transmitted. The present invention is also directed to an arrangement for radio transmission of data having a fixed station and at least one mobile station where data is transmitted in time slots using the time-division multiplex method and time-division duplex method as well as at one of a plurality of carrier frequencies using the frequency-division multiplex method.

2. Description of the Related Art

The DECT (Digital Enchanced Cordless Telecommunication) Standard was adopted at the start of the 1990's in order to replace the various existing analog and digital Standards in Europe. This is the first common European Standard for cordless telecommunications. A DECT network is a microcellular, digital mobile radio network for high subscriber densities and, is primarily designed for use in buildings. However, it is also possible to use the DECT Standard outdoors. The capacity of the DECT network of around 10,000 subscribers per square kilometer provides, from the cordless standard, ideal access technology for network operators. According to the DECT Standard, it is possible to transmit both voice and data signals. Thus, cordless data networks can also be built on a DECT base.

The DECT Standard is explained in more detail in the following text with reference to FIG. 2. A digital, cordless telecommunications system for ranges of less than 300 m has been standardized for Europe under the designation DECT. In conjunction with the switching function of a telecommunications installation, this system is therefore suitable for mobile telephone and data traffic in an office building or on a commercial site. The DECT functions supplement a telecommunications installation, and thus make it the fixed station FS of the cordless telecommunications system. Digital radio links between the fixed station FS and a maximum of 120 mobile stations MS can be produced, monitored and controlled on up to 120 channels.

A maximum of ten different carrier frequencies (carriers) are used for transmission in the frequency range from 1.88 GHz to 1.9 GHz. This frequency-division multiplex method is called FDMA (Frequency Division Multiple Access).

Twelve channels are transmitted successively in time on each of the ten carrier frequencies using the time-division multiplex method TDMA (Time Division Multiple Access). Cordless telecommunication in accordance with the DECT Standard using ten carrier frequencies with twelve channels per carrier frequency provides a total of 120 channels. Since one channel is required, for example, for each voice link, there are 120 links to the maximum of 120 mobile stations MS. The duplex method (TTD) is used on the carriers. After the twelve channels (channels 1–12) have been transmitted, the systems switch to receive, and the twelve channels (1–24) in the opposite direction are received.

A time-division multiplex frame thus comprises 24 channels (see FIG. 2). Channel 1 to channel 12 are transmitted from the fixed station FS to the mobile stations MS, while channel 13 to channel 24 are transmitted in the opposite direction, from the mobile stations MS to the fixed station FS. The frame duration is 10 ms. The duration of a channel (time slot) is 417 $\mu$s. 320 bits of information (for example voice) and 100 bits of control data (synchronization, signaling and error check) are transmitted in this time. The useful bit rate for a subscriber (channel) of 32 Kbits/s results from the 320 bits of information within 10 ms.

Integrated modules have been developed to carry out the DECT functions for fixed and mobile stations where the fixed station and the mobile station carry out similar functions. One of these in this case integrated modules is in this case the RF module, i.e. the module which carries out the actual function of receiving and transmitting the RF band.

It is known for fast hopping RF modules to be used, i.e. RF modules which can carry out a change in carrier frequency from one time slot or channel to the next. These fast hopping RF modules are intrinsically very complex and costly. Thus, in practice, slow hopping RF modules are mainly used, modules which require a certain amount of time to change the carrier frequency. In practice, the time period which the slow hopping RF module requires to change the carrier frequency corresponds essentially to the time period of a time slot. This means that, after each active time slot, (i.e., after each slot in which data are transmitted,) an inactive time slot (blind slot) must follow in which no data can be transmitted. Thus, in practice, only six links are available on one carrier frequency to the DECT standard instead of the twelve possible links.

A DECT channel is defined by its time slot and its carrier frequency. In this case, it should be noted that the organization to reuse physical channels in accordance with the DECT Standard is carried out by way of dynamic channel selection, so there is no need for any complex frequency planning, as in cellular systems. To set up a link, the signal levels of all the channels are measured continuously, and the interference-free channels are controlled in a channel list (channel map). While a link exists, the signal levels of all the channels and the reception quality continue to be monitored. If this monitoring indicates that the channel currently being used has been transmitted at a carrier frequency which is subject to interference (for example, as a result of the influence of a transmission at the same carrier frequency from or to another fixed station), another carrier frequency is automatically selected for the next active time slot and is entered in the channel list as being interference-free. This represents one option for the organization of the reuse of the channels.

Alternatively, for example, a so-called frequency hopping method can also be used, in which the carrier frequency is changed after a predetermined time period, for example, a transmission frame.

For nationals outside Europe, the DECT Standard may need to be modified and matched to local conditions. For example, in the USA, the normal DECT band between 1.88 and 1.90 GHz cannot be used for transmission, but the generally accessible 2.4 GHZ ISM band (Industrial, Scientific, Medical) is available instead. Furthermore, changes would have to be carried out for matching to the national Standards, such as the American Standard "FCC PART 15"(Federal Communications Commission). This American Standard describes the transmission method, transmission powers and available bandwidth allowed for the radio interface.

In the DECT Standard, in addition to the 320 information bits mentioned above, each time slot also contains another 104 bits required for signal transmission, as well as 56 bits in guard field, so that each time slot contains a total of 480 bits. This results in a data rate of (24×480 bits)/10 ms=) 1.152 Mbits/s. A data rate at this level is unusable in the American ISM band, since the bandwidth required per usable channel would be too large.

The publication, IEEE Personal Communications 1 (1994), New York, No. 2, $2^{nd}$ Quarter 1994, pages 36 through 35, P. D. Rasky et al., "Slow Frequency-Hop TDMA/CDMA for Macrocellular Personal Communications", discloses a method for digital radio transmission of data between a fixed station and at least one mobile station on one of a plurality of carrier frequencies, in which the data are transmitted in time slots in a time-division multiplex method and a time-duplex method. The change from one carrier frequency to another carrier frequency requires a predetermined time span on the order of magnitude of a time slot, and the data are transmitted in at least two respectively active time slots that follow one another, which are followed by a time slot in which no data are transmitted.

SUMMARY OF THE INVENTION

A The present invention thus has the object of providing a method and an arrangement for digital radio transmission of data which allow effective use of the bandwidth of a TDMA system. The method and the arrangement allows particularly , cost-effective use of the slow hopping RF modules.

According to the invention, a method is thus provided for digital radio transmission of data between a fixed station and at least one mobile station at one of a plurality of carrier frequencies. The data are transmitted in time slots (slots) using a time-division multiplex method (TDMA) and a time-duplex method (TDD). The change from one carrier frequency to another carrier frequency requires a time period corresponding to at least one time slot. The cost-effective slow hopping RF modules can thus be used. In order to allow effective utilization of the given bandwidth, the data are transmitted in at least two successive active time slots, which are followed by a time slot in which no data are transmitted, whereby the transmission from the fixed station to at least one mobile station as well as the transmission from at least one mobile station to the fixed station respectively occurs in six time slots.

In particular, the data can in each case be transmitted in two successive active time slots.

The transmission in the at least two successive active time slots can be carried out at the same carrier frequency. This allows the use of cost-effective slow hopping RF modules which cannot change the carrier frequencies from one time slot to the next.

The transmission may take place, for example, in a 2.4 GHz band.

Furthermore, an arrangement for digital radio transmission of data is provided according to the invention. This arrangement has a fixed station and at least one mobile station, between which the data can be transmitted in time slots using the time-division multiplex method (TDMA) and time-duplex method as well as at a plurality of carrier frequencies using the frequency-division multiplex method (FDMA). The fixed station at least one mobile station in this case each have an RF module which chooses the carrier frequency for transmission during one of the time slots. The RF modules require at least one time period corresponding to one time slot in order to change from one carrier frequency to another carrier frequency (slow hopping RF module). After two successive active time slots in which data are transmitted, an inactive time slot is provided, in which no data are transmitted, whereby the transmission from the fixed station to at least one mobile station as well as the transmission from at least one mobile station to the fixed station respectively occurs in six time slots.

The carrier frequency in the at least two successive active time slots may be the same.

The carrier frequencies may be in a 2.4 GHz band.

As so-called slow hopping RF modules, the carrier frequencies may be changed during the inactive time slot.

BRIEF DESCRIPTION OF THE DRAWINGS

The invention will now be explained in more detail using an exemplary embodiment and with reference to the accompanying drawings:

FIG. 1 is a schematic diagram showing an arrangement according to the invention for digital radio transmission of data, FIG. 2 is a timing/frequency diagram illustrating of the known DECT Standard.

DESCRIPTION OF PREFERRED EMBODIMENTS

Figure 3:
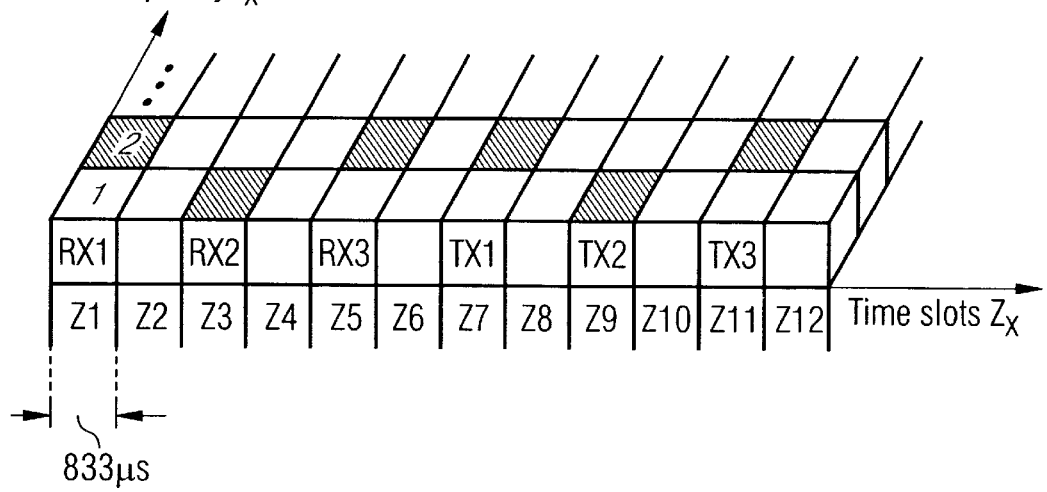
FIG. 3 shows a schematic illustration of the channel allocation for matching the known DECT Standard to the American ISM band.

FIG. 1 shows an arrangement for digital radio transmission of data. A fixed station 1 is connected to the fixed network by way of a terminal line 10. The fixed station 1 has an RF module 4, using which data can be transmitted and received by way of an antenna 6. The RF module 4 may be, in particular, a so-called slow hopping RF module, (i.e., a particularly cost-effective RF module) which intrinsically requires a certain period of time to change from one carrier frequency to another. This time period, which is required for the carrier frequency change, may correspond, for example, to the time period which is filled by one time slot in a time-division multiplex method (TDMA). The time period is thus between 100 µs and 1 ms, and, in particular, between 300 µs and 500 µs. By way of the antenna 6, a radio transmission may be made via a radio transmission path 8 to a mobile station 2, or a radio transmission may be made to a mobile station A (cordless telephone) 3 via a second radio transmission path 9. All of the mobile stations illustrated in FIG. 1 are of the same design, so that a more detailed explanation will be given only on the basis of the illustrated mobile station 2.

As can be seen in FIG. 1, this mobile station 2 has an antenna 7 for receiving and for transmitting data from and, respectively, to the fixed station 1. The mobile station 2 contains an RF module 5, which essentially corresponds to the RF module 4 used in the fixed station 1. The RF module 5 of the mobile station 2 may thus also be a slow hopping RF module.

FIG. 2 illustrates how the known DECT Standard can be matched to the American ISM band. If the DECT Standard were retained, the resulting data rate would be too high for the ISM band. As can be seen in FIG. 3, the number of time slots per frame can for this reason, be halved, i.e., only 12 time slots Z1–Z12 are provided in the ten milliseconds of a time frame instead of the 24 time slots (channels) in the DECT Standard, each of which 12 time slots can be used to transmit 480 bits. By halving the number of time slots, the data rate is also halved, in a corresponding manner, to (12×480 bits)/10 ms=576000 bits/s. This lower data rate results in a bandwidth that is acceptable for the American ISM band.

As can be seen in FIG. 3, it is necessary to provide slow hopping RF modules in a cost-effective implementation of the equipment required for radio transmission, which means that each active time slot in which data are transmitted must be followed by an inactive time slot (blind slot) in which no data can be transmitted. If twelve time slots Z1–Z12 are provided (6 time slots Z1–Z6 for transmission from a mobile station to the fixed station and 6 time slots Z7–Z12 for transmission from the fixed station to a mobile station), then a maximum of only three possible links is available. In an implementation using the cost-effective slow hopping RF modules, the usable channel capacity is thus not very great as a result of the restriction by the slow hopping RF module to a maximum of three links.

Possible active time slots are illustrated as shaded in FIG. 3. For example, as illustrated, a transmission from the fixed station 1 to a mobile station 2, 3 can be made at the carrier frequency $f_2$ in the time slot Z1 (RX1). If this time slot Z1 is followed by a time slot Z2, in which no data transmission takes place (inactive time slot, blind slot), a slow hopping RF module can also use the time duration of the inactive time slot Z2 to change the carrier frequency. As illustrated in FIG. 3, the carrier frequency can be changed, for example, from the carrier frequency $f_2$ to the carrier frequency $f_1$. Thus, as illustrated in FIG. 3, a transmission can be made in the time slot Z3 from the fixed station to a mobile station, at the carrier frequency $f_1$ (RX2). The layout shown in FIG. 3 is thus distinguished by the fact that, with the given time slot distribution, an active time slot (illustrated shaded) can be operated at each of the predetermined carrier frequencies ($f_1$, $f_2$, etc.).

The organization of reuse of physical channels in accordance with the DECT Standard is carried out by way of dynamic channel selection, a channel being defined by its carrier frequency and its time slot. There is thus no need for any complex frequency planning, as in cellular systems. To set up a link, the signal levels of all the channels are measured continuously, and the interference-free channels are controlled in a channel list (channel map). During a link, the signal levels of all the channels of all the possible carrier frequencies, and the reception quality, continue to be monitored. This represents one option for the organization of the reuse of the channels.

Alternatively, for example, a frequency hopping method can also be used in which the carrier frequency is changed after a predetermined time period, for example, a transmission frame.

Thus, as illustrated in FIG. 3, if it is found in the time slot Z1 when transmitting (RX1) at the carrier frequency $f_2$ that the reception or transmission conditions are better at the carrier frequency $f_1$, then it is possible to change, during the time duration of the time slot Z2 in which no data transmission is taking place, to the carrier frequency 1 which has been identified as being better. The transmission RX2 takes place during the time slot Z3 at the carrier frequency $f_2$ which has been found to be better.

As already stated, the channel allocation scheme illustrated in FIG. 3 has the disadvantage that, since the number of time slots per time frame is halved to 12, resulting in the duration of a time slot being doubled to 833 µs and as a result of the necessity for the inactive time slots after each active time slot, only three possible links (three links from a fixed station to a mobile station and three links from a mobile station to a fixed station) are available, in contrast to the six possible links according to the DECT Standard.

Figure 4:
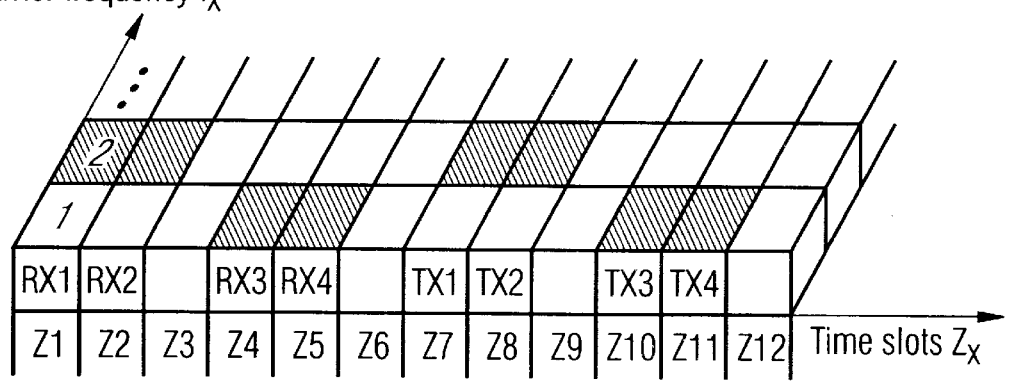
FIG. 4 is a timing/frequency diagram illustrating a particularly effective allocation of the channels from the DECT Standard matched to the ISM band, according to the invention.

FIG. 4 illustrates a time slot structure which allows the maximum possible number of links to be increased from three to four. As can be seen in FIG. 4, this increase in the maximum possible number of links from three to four is essentially achieved by two active time slots in each case following one another (illustrated shaded). Two active time slots are subsequently followed by a time slot in which no data transmission takes places (blind slot). The frequency programming for the respective next time slots can then also be carried out by a slow hopping RF module during this inactive time slot. The two successive active time slots are intrinsically operated at the same carrier frequency.

As illustrated in FIG. 4, a data transmission from the fixed station to a mobile station can take place at a carrier frequency $f_2$ (RX1) for example during the time slot Z1. According to the invention, the following time slot Z2 is also active, i.e., a data transmission is carried out from the fixed station to a mobile station during the time slot Z2 at the same carrier frequency $f_2$ as during the first time slot Z1 (RX2). The time slot Z3 is a so-called inactive time slot during which no data transmission takes place and, instead of this, the frequency programming for the following time slots can be carried out. The duration of a time slot is 833 µs if a time frame lasts for 10 ms and 12 time slots are provided in one time frame, and this is easily sufficient for a carrier frequency change by a slow hopping RF module. If it is found that the carrier frequency $f_1$ has better reception/transmission conditions than the carrier frequency $f_2$, then the carrier frequency can be changed from the carrier frequency $f_2$ to the carrier frequency $f_1$ during the inactive time slot Z3. Thus, as illustrated, data transmission can take place from a fixed station to a mobile station at the carrier frequency $f_1$ during the time slot Z4 (RX3). A data transmission from the fixed station to a mobile station can in turn take place at the same carrier frequency $f_1$ as during the time slot Z4, in the time slot Z5 (RX4). The active time slot Z5 is in turn followed by an inactive time slot Z6.

As an example, FIGS. 3 and 4 illustrate the carrier frequency fx not being changed for transmission between a base station and a specific mobile part. As an alternative, a frequency hopping method can also be used in which the carrier frequency is changed after a predetermined time period, for example, a transmission frame.

After half the time slots in a time frame, i.e., after six time slots Z1–Z6, the reverse transmission takes place from the mobile stations to the fixed station in the time slots Z7–Z12 (time division duplex TDD). For example, a transmission from one mobile station to the fixed station can thus be carried out at the carrier frequency $f_2$ in the active time slots Z7 and Z8 (TX1, TX2). This is followed by an inactive time slot Z9, in which the carrier frequency can be changed. A data transmission from mobile stations to the fixed station can then be made, at the carrier frequency $f_1$, in the following time slots Z10 and Z11 (TX3, TX4). A total of eight channels, and thus four links, are available overall per RF module in the fixed station.

According to the invention, the efficiency of a TDMA transmission is increased without increasing the level of complexity, particularly with respect to the RF modules, and with a constant transmission band width.

The above-described method and arrangement are illustrative of the principles of the present invention. Numerous modifications and adaptions thereof will be readily apparent to those skilled in this art without departing from the spirit and scope of the present invention.

List of Reference Symbols

1: Fixed station
2: Mobile station (cordless telephone)
3: Mobile station
4: RF module, fixed station
5: RF module, base station
6: Antenna, fixed station
7: Antenna, mobile station
8: First radio transmission path
9: Second radio transmission path
10: Terminal line
Zx: Time slot (slot)
fx: Carrier frequency

What is claimed is:

1. A method for digital radio transmission of data between a fixed station and a mobile station at one of a plurality of carrier frequencies comprising the steps of:

transmitting said data in time slots using a time-division multiplex method and a time-division duplex method, wherein the change from one carrier frequency to another carrier frequency for a subsequent time slot requires a predetermined time period on the order of magnitude of one time slot;

transmitting said data in two successive active time slots, which are followed by an inactive time slot in which no data are transmitted;

transmitting six time slots from said fixed station to said mobile station; and transmitting six time slots from said mobile station to said fixed station, after said step of transmitting from said fixed station.

2. A method according to claim 1, wherein said transmission in said two successive active time slots takes place at the same carrier frequency.

3. A method according to claim 1, wherein said time period to change a carrier frequency is the duration of a time slot.

4. A method according to claim 1, wherein said transmission takes place in a 2.4 GHz band.

5. An arrangement for digital radio transmission of data, comprising:

a fixed station comprising a RF module:

a mobile station, comprising a RF module wherein said fixed station and said mobile station transmit said data in time slots using a time-division multiplex method and a time-division duplex method as well as one of a plurality of carrier frequencies using a frequency-division multiplex method;

wherein said RF modules comprise a mechanism for choosing a carrier frequency for transmission during one of said time slots, said RF modules requiring a predetermined time period in the order of magnitude of one time slot for the change from one carrier frequency to another carrier frequency for the next time slot, and wherein said arrangement transmits said data in two successive active times slots, followed by an inactive time slot in which no data are transmitted, wherein said fixed station uses six time slots for transmitting to said mobile station, and wherein said mobile station uses six time slots subsequent to said fixed station transmitting six time slots for transmitting to said fixed station.

6. An arrangement according to claim 5, wherein the carrier frequency in said two successive active time slots is the same.

7. An arrangement according to claim 5, wherein a time period for a change in the carrier frequency is equal to the duration of one time slot.

8. An arrangement according to claim 5, wherein said carrier frequencies are in a 2.4 GHz band.

9. An arrangement according to claim 5, wherein said RF modules change carrier frequencies during said inactive time slot.

* * * * *